UNITED STATES PATENT OFFICE.

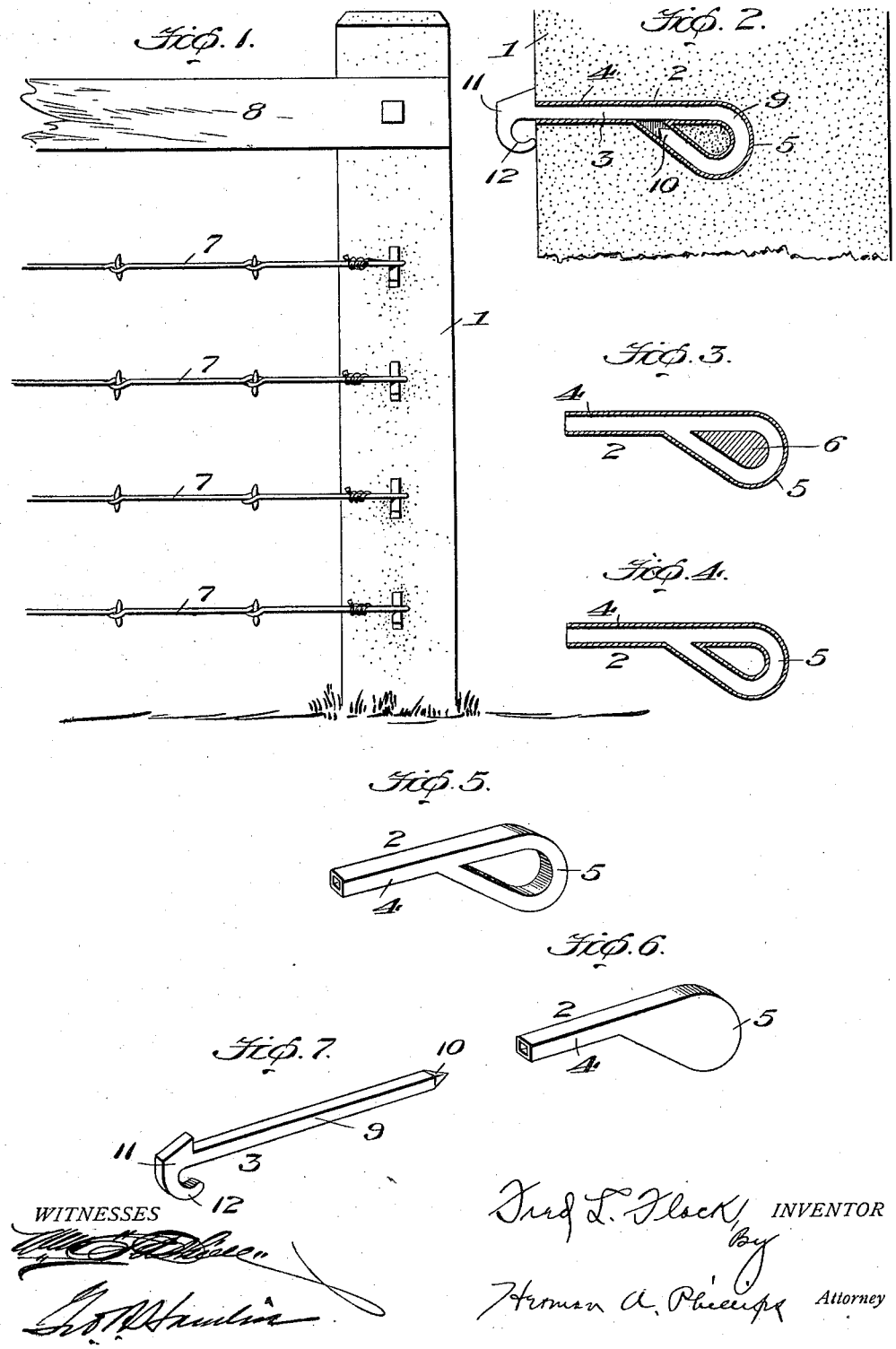

FRED L. FLACK, OF OSKALOOSA, IOWA.

STAPLE-ATTACHING DEVICE FOR MOLDED FENCE-POSTS.

1,029,859.  Specification of Letters Patent.  Patented June 18, 1912.

Application filed September 27, 1911. Serial No. 651,660.

*To all whom it may concern:*

Be it known that I, FRED L. FLACK, a citizen of the United States, residing at Oskaloosa, county of Mahaska, and State of Iowa, have invented certain new and useful Improvements in Staple-Attaching Devices for Molded Fence-Posts, of which the following is a specification.

This invention relates to staple attaching devices for molded fence posts.

My invention has for its object the provision of a simple and cheap attaching device of novel construction for connecting staples or other fasteners to molded structures, particularly fence posts, which is adapted to be embedded in the post during its manufacture and to serve as a receptacle for and means for clenching a staple or other fastener to the post in such manner that it will be secure against detachment.

The advantage of my invention is that it clenches and anchors the staple in a new manner so that the latter cannot pull out and also affords means whereby, with a fence post for instance, the fence wires may be firmly held to the post at the time the staple is driven into the new anchor and clenching devices which the present invention provides so that there is no looseness of the wires.

My invention may be used, not only to secure a fence wire, but for the purpose of securing a wooden fence board or rail which would not be possible if the entire fastener were molded into the post during the formation of the latter.

In connection with the novel anchoring device which I employ which is adaptable for reception of any staple, nail or fastener, I preferably provide a special form of staple adapted to coöperate with the anchoring device in a new manner so that the staple cannot turn or twist.

The invention is set forth fully hereinafter and the novel features are recited in the appended claims.

In the accompanying drawings:—Figure 1 is a view of the invention in use; Fig. 2, an enlarged longitudinal section showing the staple in position where the plastic material forms the clenching part; Fig. 3, a longitudinal section of the anchoring device cast in a single piece; Fig. 4, a similar view of the anchoring device of Fig. 2; Fig. 5, a detail perspective of the anchoring device of Fig. 4; Fig. 6, a detail perspective of the anchoring device of Fig. 3; and Fig. 7, a perspective of the staple.

I wish it understood that my invention is not restricted to use on fence posts as it may be provided for any molded structure.

In molding the fence post 1, the new anchoring device 2 is embedded or molded therein, being adapted for the reception of the staple, fastener, nail, or the like 3 which latter is, however, preferably of special form although I do not restrict myself to the exact form shown at 3 as other nails and fasteners may be used.

The anchoring device 2 may be made in the form of a casting or of bent tubular material. It has a receiving stem 4, preferably rectangular in cross-section, one side of which may be left open if desired, or all sides may be closed. This stem is joined to a bent, curved, or looped part 5 which, in the case of a casting, will have a solid semi-heart-shaped part 6 which serves as a cam to bend the staple. If the anchor is made of tubular material, the heart-shaped solid part 6 may be separately formed and inserted in the loop 5 and the entire device embedded in the post or other structure 1.

I am aware that various modifications can be resorted to in making this anchor and in the shape of the clenching part 6, which serves to reflect the staple or fastener 3 or the nail which may be used to secure the fence wire 7 or wooden slat 8.

The fastener 3 has a shank 9 preferably of the same cross-sectional contour as that of the stem 4 and loop 5 and a trifle smaller in size so that it may readily enter the stem but will be prevented from turning therein. The staple is provided with a pointed end 10 and with a solid head 11 of the same thickness as the shank 9, said head having a hooked part 12.

In molding the anchors in the post or other structure 1 they are disposed so that the mouth of the stem 4 is at or adjacent the face of the post. The end 10 of the staple or fastener 3 is inserted in the mouth of the shank 4 and blows delivered on the head 11. The shank 9 passes into the stem or shank 4 until it strikes the curved part of the loop, whereupon it is deflected and curls around and clenches against the solid clenching part 6, firmly engaging the fastener against detachment and also permitting the hooked part 12 to be bound firmly against the fence wire 7 to hold it tightly against the post. A nail or spike of different form may be used in securing the slat or rail 8 by driving said nail through the slat and into the shank 4.

The solid part 6 may be omitted and the anchor embedded with an opening into the concrete or cement of the molded post 1 or other structure will flow when the device is embedded therein, thus taking the place of the solid clenching part 6, and I do not limit myself, therefore, to the use of a solid part 6 as a manufactured part of the anchor.

Having thus described my invention, what I claim as new, and desire to secure by Letters Patent, is:—

1. As an article of manufacture an attaching anchor comprising a straight tubular stem and a return curved portion uniting with the straight portion approximately midway thereof.

2. The combination with a molded structure, of an integral attaching anchor, comprising a straight tubular stem and a return curved portion uniting therewith approximately midway the stem, and a headed fastener driven into and conforming to the shape of the anchor.

In testimony whereof, I hereunto affix my signature in presence of two witnesses.

FRED L. FLACK.

Witnesses:
 EDITH S. GUNN,
 G. W. SHOCKLEY.